United States Patent
Nyberg et al.

(12) 
(10) Patent No.: US 6,646,020 B2
(45) Date of Patent: Nov. 11, 2003

(54) ISOPROPYL CHLORIDE WITH HYDROFLUOROCARBON OR HYDROFLUOROETHER AS FOAM BLOWING AGENTS

(75) Inventors: Janice M. Nyberg, Witchita, KS (US); Eric L. Mainz, Goddard, KS (US)

(73) Assignee: Vulcan Chemicals a division of Vulcan Materials Company, Birmingham, AL (US)

(*) Notice: Subject to any disclaimer, the term of this patent is extended or adjusted under 35 U.S.C. 154(b) by 0 days.

(21) Appl. No.: 10/076,695

(22) Filed: Feb. 14, 2002

(65) Prior Publication Data

US 2002/0198273 A1 Dec. 26, 2002

Related U.S. Application Data

(60) Provisional application No. 60/293,011, filed on May 23, 2001.

(51) Int. Cl.[7] ............................................. C08G 18/10
(52) U.S. Cl. ..................... 521/170; 510/408; 510/412; 510/415; 521/131; 521/155; 521/170; 521/172; 521/173; 521/174
(58) Field of Search .......................... 521/131, 155, 521/170, 172, 173, 174; 510/408, 412, 415

(56) References Cited

U.S. PATENT DOCUMENTS

| | | | |
|---|---|---|---|
| 4,381,066 A | 4/1983 | Page et al. ................. | 222/394 |
| 4,898,893 A | 2/1990 | Ashida ........................ | 521/131 |
| 5,064,872 A | 11/1991 | Monstrey et al. ........... | 521/131 |
| 5,066,418 A | 11/1991 | Merchant .................... | 252/172 |
| 5,116,525 A | 5/1992 | Merchant .................... | 252/171 |
| 5,149,473 A | 9/1992 | LeDuc ......................... | 264/51 |
| 5,213,707 A | 5/1993 | Swan et al. .................. | 252/172 |
| 5,260,344 A * | 11/1993 | Ashida et al. ............... | 502/115 |
| 5,523,333 A * | 6/1996 | Fishback et al. ............ | 521/131 |
| 5,556,894 A | 9/1996 | Fishback et al. ............ | 521/168 |
| 6,455,601 B1 * | 9/2002 | Singh et al. ................. | 521/131 |

* cited by examiner

*Primary Examiner*—John M. Cooney, Jr.
(74) *Attorney, Agent, or Firm*—Armstrong, Westerman & Hattori, LLP

(57) ABSTRACT

A composition useful as a blowing agent having no flash point or reduced combustibility comprising 2-chloropropane and a gas selected from the group consisting of a fluorohydrocarbon, perfluorocarbons, fluoroethers, hydrofluoropolyethers and mixtures thereof is disclosed. A polyisocyanurate foam or a polyurethane modified polyisocyanurate foam having a mainly closed cell structure and also a method for preparing this foam, the latter comprising closed cells wherein a foam blowing agent consisting of a mixture of 2-chloropropane and one or more HFC compounds including pentafluoropropane, pentafluorobutane, heptafluoropropane, hexafluoropropane or pentafluoroethane are disclosed. Pentanes can be added if desired. Azeotropic mixtures in which 2-chloropropane is an ingredient are disclosed.

28 Claims, 4 Drawing Sheets

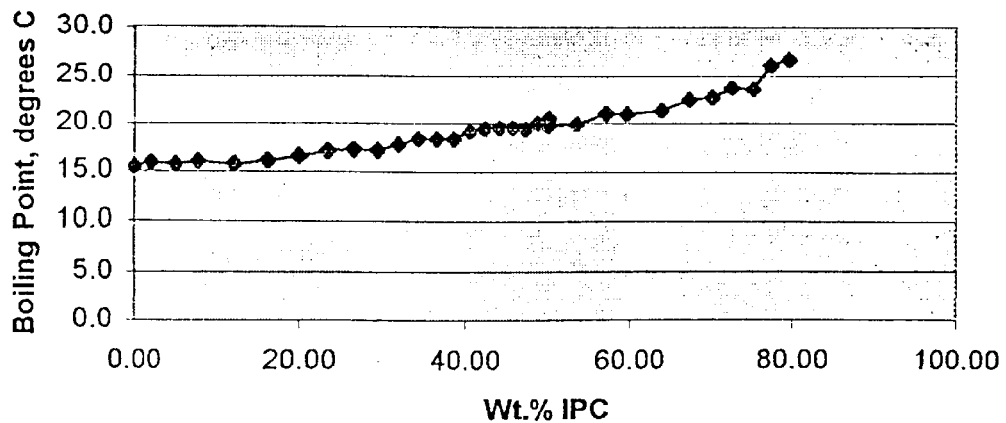
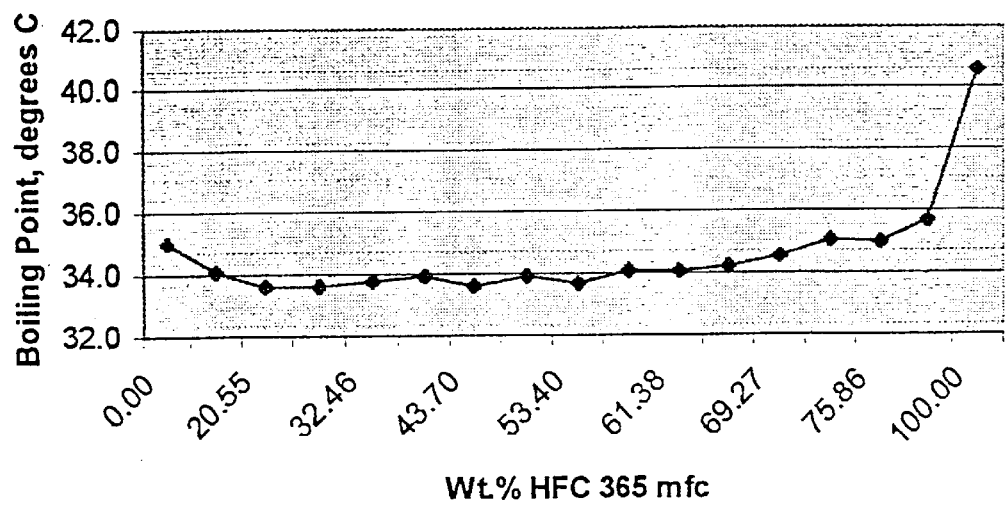

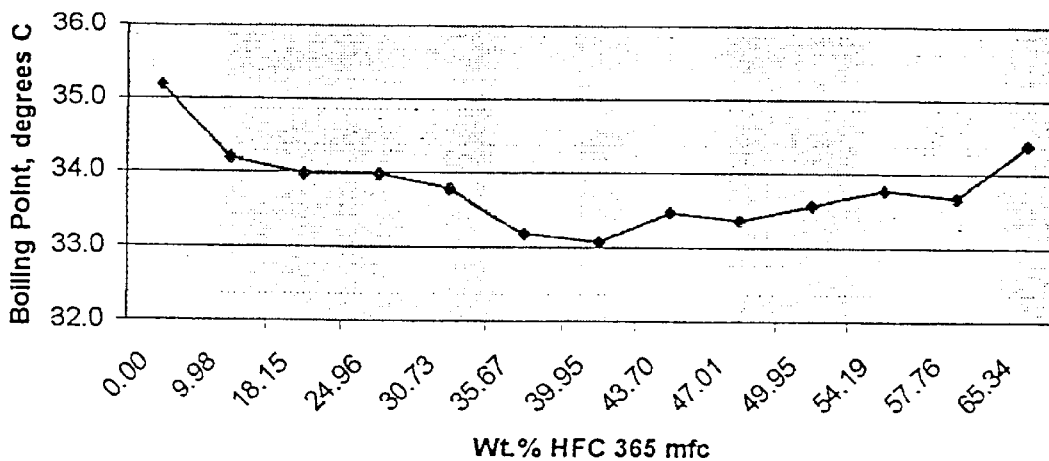
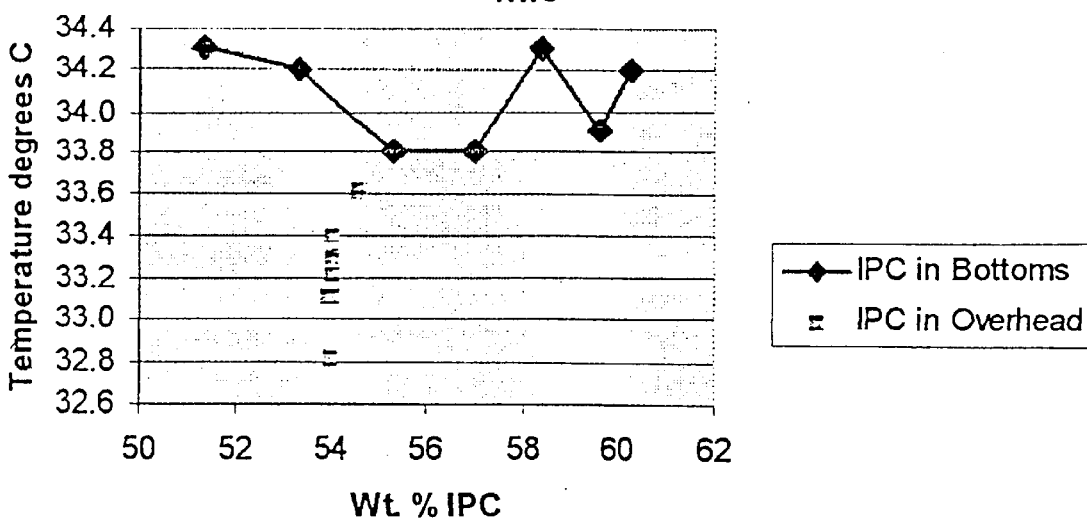

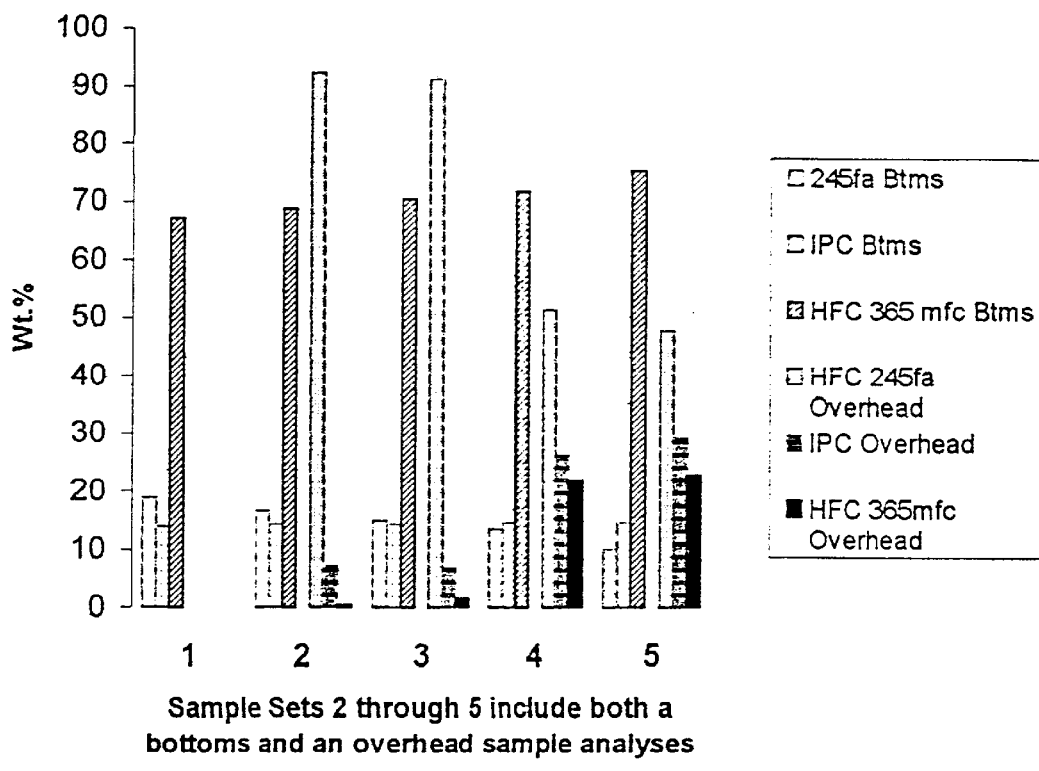

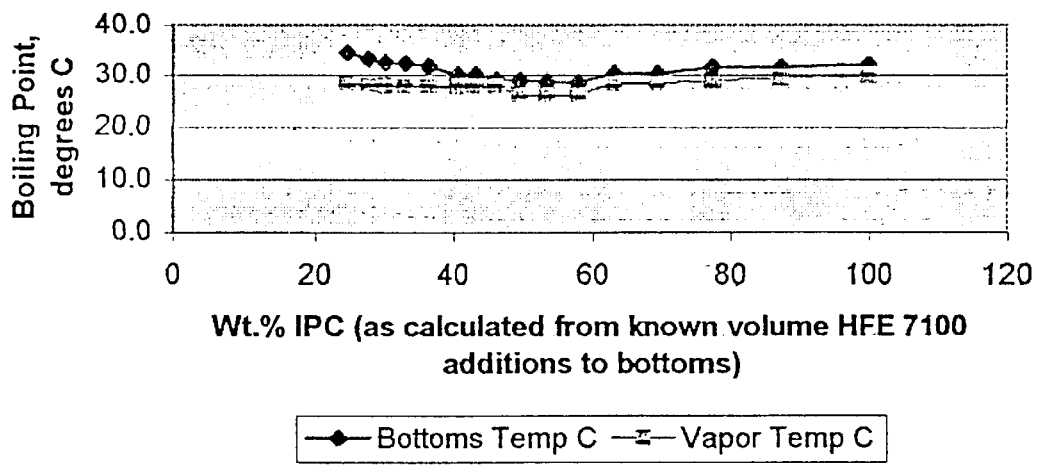
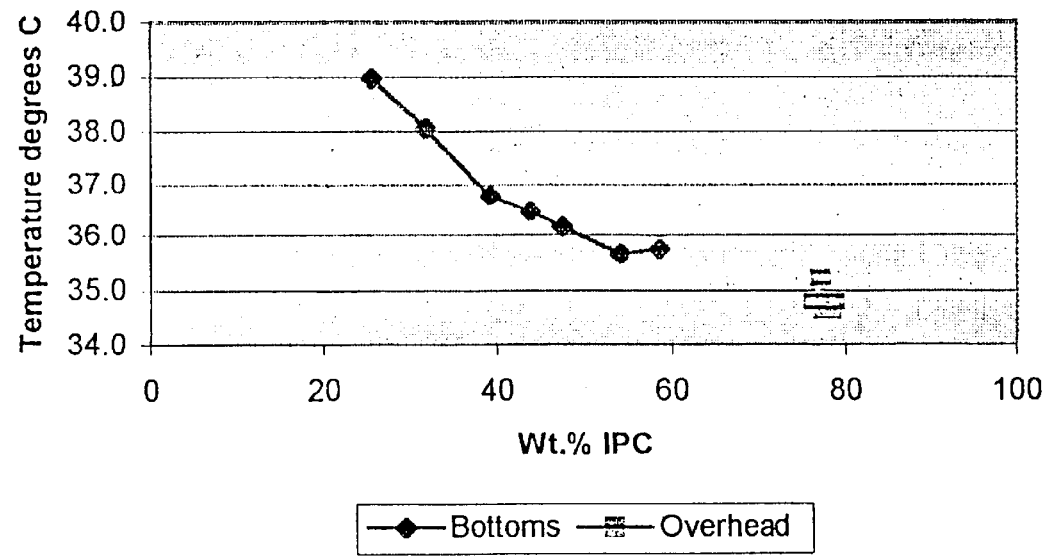

ISOPROPYL CHLORIDE WITH HYDROFLUOROCARBON OR HYDROFLUOROETHER AS FOAM BLOWING AGENTS

RELATED APPLICATIONS

This application is related to Provisional Application Ser. No. 60/293,011 filed May 23, 2001.

FIELD OF THE INVENTION

The herein disclosed invention finds applicability in the field of plastic foam manufacture and more particularly in the field of plastic blowing agents. More particularly, the invention herein disclosed is directed to producing blowing agents with reduced flammability.

BACKGROUND OF THE INVENTION

Closed-cell polyurethane foams are widely used for insulation purposes in building construction and in the manufacture of energy efficient electrical appliances. In the construction industry, polyurethane (polyisocyanurate) board stock is used in roofing and siding for its insulation and load-carrying capabilities. Poured and sprayed polyurethane foams are also used in construction. Sprayed polyurethane foams are widely used for insulating large structures such as storage tanks, etc. Pour-in-place polyurethane foams are used, for example, in appliances such as refrigerators and freezers plus they are used in making refrigerated trucks and railcars. All of these polyurethane foams require expansion agents (blowing agents) for their manufacture. Insulating foams depend on the use of halocarbon blowing agents, not only to foam the polymer, but primarily for their low vapor thermal conductivity, a very important characteristic for insulation value. Historically, polyurethane foams are made with CFC-11(trichlorofluoromethane) as the primary blowing agent.

The art is continually seeking new fluorocarbon based azeotropic mixtures or azeotrope-like mixtures which offer alternatives for new and special applications for industrial cleaning, blowing agent and aerosol applications. Currently, fluorocarbon-based azeotrope-like mixtures are of particular interest because they are considered to be stratospherically safe substitutes for presently used fully halogenated chlorofluorocarbons (i.e., e.g., CFC-11, CFC-12, CFC-113). The latter have been implicated in causing environmental problems associated with the depletion of the earth's protective ozone layer.

Accordingly, it is an object of the present invention to provide novel environmentally acceptable azeotrope-like compositions which are useful in a variety of applications including industrial cleaning, blowing agent and aerosol applications. More particularly, the herein disclosed invention is directed to formulations wherein the flammability of 2-chloropropane (IPC) is reduced so that it can be used in blowing agent applications.

The following U.S. patents are of interest as showing various blowing agent compositions, but do not disclose the inventive compositions disclosed herein.

| Inventors | U.S. Pat. Nos. |
| --- | --- |
| Merchant | 5,066,418 |
| Merchant | 5,116,525 |
| LeBuc | 5,149,473 |

Swan (U.S. Pat. No. 5,213,707) teaches an azeotrope-like mixture of 2-chloropropane and a chlorofluorohydrocarbon, as seen in col. 3, lines 40–55; however, this reference does not teach 2-chloropropane with a hydrofluorohydrocarbon per se. The composition of Swan always contains a chlorofluorohydrocarbon.

Ashida (U.S. Pat. No. 4,898,893) teaches isopropyl chloride as a blowing agent together with liquid chlorofluorocarbon as a blowing agent. This reference is deficient in not disclosing an azeotropic mixture with reduced flammability and specifically does not disclose fluorocarbons.

Monstrey (U.S. Pat. No. 5,064,872) discloses 2-chloropropane and chlorofluorohydrocarbons. This reference does not recognize the fact of no flash point or reduced combustibility of the herein disclosed invention. Nor is the recognition of azeotropic mixtures recognized.

OBJECT OF THE INVENTION

A main object of the invention is to formulate nonflammable blowing agents.

A most significant object of this invention is to produce blowing agents containing 2-chloropropane which have reduced flammability.

A further object of this invention is the formulation of azeotropic mixtures which are useful in the formulation of blowing agents.

These and other objects of the present invention will become apparent from a reading of the following specification taken in conjunction with the enclosed drawings.

BRIEF SUMMARY OF THE INVENTION

The herein disclosed invention is directed to formulations containing 2-chloropropane wherein the flammability of the 2-chloropropane has been reduced.

DESCRIPTION

The herein disclosed invention relates to a polyisocyanurate foam or with polyurethane modified polyisocyanurate foam, which show very good fire-resistant and thermo-insulating properties.

The presently known polyisocyanurate foams and polyurethane modified polyisocyanurate foams, which are prepared by using a physical blowing agent, consisting of hydrochlorofluorocarbons, distinguish themselves as an insulation material by their good and lasting insulation coefficient, their good dimensional stability and their excellent fire behavior. It is accepted that the use of these hydrochlorofluorocarbon compounds as blowing agents, offer good fire-resistance and contribute to the excellent fire behavior of the foams concerned. As is well-known, such blowing agents show important drawbacks and nowadays it is accepted that they, in part, are responsible for the destruction of the ozone layer in the stratosphere and would, at the same time, increase the greenhouse effect on earth. Accordingly, the herein disclosed invention is intended to remedy these important drawbacks. A polyisocyanurate foam or polyurethane modified polyisocyanurate foam is proposed which shows the above mentioned beneficial properties, especially the good insulation coefficient and the excellent fire behavior, but not the disadvantages of the ones which are involved with the use of hydrochlorofluorocarbons, such as HCFC-141b. To this end, the polyisocyanurate foam or the polyurethane modified polyisocyanurate foam describes, according to the invention, closed cells wherein 2-chloropropane, in combination with hydrofluorocarbons and, if desired, pentanes are enclosed.

The invention relates also to a method for preparing the foam concerned, wherein a physical blowing agent is used for obtaining the foam structure, which method is characterized in that a 2-chloropropane containing physical blowing agent is applied. In a particular embodiment of the invention, use is made of a physical blowing agent consisting of at least 5% isopropyl chloride (2-chloropropane). 2-Chloropropane (isopropyl chloride) is a clear colorless liquid and has a flash point of −32° C.

For the manufacture of these polyisocyanurate foams, use is essentially made of the mutual trimerization and other reactions of polyisocyanates, effected by typical catalysts. These polyisocyanurates are known for their exceptional fire behavior.

Since pure polyisocyanurate foams often have inadequate physical properties, they are in practice usually mixed with polyurethanes based on the same isocyanate and certain polyols, so that a reaction starts which develops synchronously with the trimerization. These foams are called polyurethane modified polyisocyanurates.

Besides the polyisocyanate, the polyols, the typical catalysts and the blowing agents, use is also made of foam stabilizers, flame extinguishing additives, etc.

The organic polyisocyanate compounds are of the $R(NCO)_n$, wherein n>2 and R represents an aliphatic or aromatic group. Preferably, use is made of diisocyanates or polyisocyanates comprising on average 2 to 4 isocyanate groups per molecule. A typical example thereof comprises diphenylmethane-4,4"-diisocyanate (MDI) and mixtures of the latter with its polymeric forms ("crude"MDI), which are usually applied in the manufacture of rigid polyurethane foam and polyisocyanurate foam.

Under the influence of specific catalysts, such isocyanates can mutually react by dimerization and trimerization to form polyisocyanurate. In order to modify such polyisocyanurates with polyurethanes, each molecule with active hydrogen groups. E.g., R—OH, R13 COOH, R—SH, $R_2$—NH, R—$NH_2$, R—SH, . . . is in principle appropriate for use as reactive substrate. Preferable substrates include polyalcohols of the polyetherpolyol or polyesterpolyol type or mixtures thereof. A molecular weight >150, and preferably between 500 and 5000, is characterizing. The functionality is always higher or equal to 2 and an important property is a hydroxyl number (IOH) between 25 and 1000, more specifically between 150 and 850. Also, for this reaction, there exists more specific catalysts.

Where, for the preparation of polyurethane, use is made of an isocyanate index situated near the stoichiometric ratio, i.e., 95 to 110, a much higher index is necessary for the preparation of polyurethane modified polyisocyanurates so as to allow the mutual isocyanate trimerization reaction. Normally, this isocyanate index is >150.

In order to obtain the typical foam structure, it is necessary to make the foam using a chemical or physical blowing agent. As a chemical blowing agent, $H_2O$ is used, which liberates $CO_2$ "in situ" by reaction with isocyanate. As physical blowing agents, low boiling organic liquids are used which evaporate by the exothermic trimerization, urethane and urea reactions and lead also to the typical foam structure. As physical blowing agents, use is usually made of hydrochlorofluorocarbon compounds (HCFC's), such as for example fluorodichloroethane also known as HCFC-141b. This blowing agent will be phased out of use beginning Jan. 1, 2003.

Broadly considered the herein disclosed invention is directed to compositions useful as blowing agents having no flash point or reduced combustibility comprising 2-chloropropane and an effective amount of a gas selected from the group consisting of a fluorohydrocarbon, perfluorocarbons, fluoroethers, hydrofluoropolyethers and mixtures thereof. Examples of the gas are perfluorocarbons selected from the group of octofluoropropane, hexafluoroethane, octafluorocyclobutane, perfluoropropylene, tetrafluoromethane and mixtures thereof; fluoroethers selected from the group consisting of bis(2,2,2-trifluoroethyl)ether, n-butyl-1,1,2,2-tetrafluoroethyl ether, difluoromethyl 2,2,2-trifluoroethyl ether, ethyl 1,1,2,2-tetrafluoroethyl ether, 1,1,1,3,3,3-hexafluoro-2-(fluoromethoxy) propane and mixtures thereof, and also a mixture of methyl nonafluoroisobutyl ether and methyl nonafluorobutyl ether; hydrofluoropolyethers selected from the group consisting of 1-difluoromethoxy-bis-(difluoromethyl ether, 1-difluoromethoxy-1,1,2,2-tetrafluoroethyl difluoromethyl ether and mixtures thereof; fluorohydrocarbon selected from the group consisting of 1,1,1,3,3 pentafluoropropane, 1,1,1,2,3,3,3 heptafluoropropane, 1,1,1,3,3,3 hexafluoropropane, 1,1,1,3,3 pentafluorobutane and 1,1,1,2 tetrafluoroethane; and the mixture of methyl nonafluoroisobutyl ether and methyl nonafluorobutyl ether and further mixtures thereof. Once the components producing blowing agents of no flash point or reduced combustibility are known, the optimum amounts to use can be determined by those skilled in the art.

Specific examples of compositions useful as a blowing agent having no flash point or reduced combustibility comprise about 80–90% of 2-chloropropane and about 10–20% of 1,1,1,3,3,3 hexafluoropropane; comprise greater than 0.5% to less than 50.2% of 2-chloropropane and 1,1,1,3,3 pentafluoropropane; comprise about 16.5 to 43.5% of 2-chloropropane and about 83.5 to 56.5% of 1,1,1,3,3 pentafluoropropane; comprise greater than 0.5% to less than 93% 2-chloropropane and the balance being 1,1,1,2,3,3,3 heptafluoropropane; comprise about 58 to 93% 2-chloropropane and about 42 to 7% 1,1,1,2,3,3,3 heptafluoropropane; an azeotrope-like mixture at one atmosphere of pressure comprising about 50–60% 2-chloropropane and about 40–50% 1,1,1,3,3 pentafluorobutane; an azeotrope-like mixture at one atmosphere of pressure comprising about 54% 2-chloropropane and about 46% 1,1,1,3,3 pentafluorobutane; and an azeotrope-like mixture at one atmosphere of pressure comprising about 78% 2-chloropropane and about 22% of a mixture of methyl nonafluoroisobutyl ether and methyl nonafluorobutyl ether.

Also contemplated by this invention are polyisocyanurate foams or polyurethane modified polyisocyanurate foams having a mainly closed cell structure, comprising closed cells wherein 2-chloropropane gas is enclosed in combination with a different gas or gases which lower the combustibility of the 2-chloropropane. The gas present in the cells comprises at least 5% by weight of 2-chloropropane.

The invention envisions a method for preparing mainly closed, cell shaped polyisocyanurate foam or polyurethane modified polyisocyanurate foam, wherein foam formation is performed with the use of a physical blowing agent comprising 2-chloropropane along with another gas which lowers the combustibility of the 2-chloropropane and wherein said physical blowing agent comprises at least 5% of 2-chloropropane. The 2-chloropropane can be used together with a hydrofluorocarbon blowing agent. The 2-chloropropane can be used in combination with other inert compounds having a relatively low boiling point or sublimation point. The amount of physical blowing agent used is comprised of between 1 and 50 parts by weight per 100 parts by weight of said polyisocyanurate foam or polyurethane modified polyisocyanurate foam. The hydrofluorocarbon blowing agent can be selected from the group consisting of tetrafluoroethane, pentafluoropropane, pentafluorobutane, heptafluoropropane, hexafluoropropane and pentafluoroethane. The inert compound can be selected from the group consisting of pentane, isopentane, cyclopentane, cyclopentene, methyl formate, dimethylether and diethylether. The physical blowing agent is used in an amount of between 1 and 30 parts by weight per 100 parts by weight of polyisocyanurate foam or polyurethane modified polyisocyanurate foam.

In this invention, the HCFC's are replaced by 2-chloropropane mixtures. The mixtures are comprised of 2-chloropropane and blowing agents, such as for example, pentafluoropropane, pentafluorobutane, heptafluoropropane and hexafluoropropane (HFCs). Pentanes including normal pentane, isopentane and cyclopentane can be mixed with the 2-chloropropane and the HFCs and be used as blowing agents. The total blowing agent amount, which is used, is dependent on the foam density to be reached and on the molecular weight of the blowing agents. Amounts between 1 and 50% by weight, and preferably between 1 and 30% by weight, are typical. A most significant consideration is that the combustibility of 2-chloropropane is reduced or eliminated by the addition of selected additives. This allows normally combustible chloropropane to be used in blowing agent compositions.

As a foam stabilizer, silicon based products, such as polyalkylsiloxane polyether copolymers, are mostly used. Use can also be made of non silicon containing tensio-active substances. Preferably, amounts of 0.1–10 parts by weight, and more specifically between 0.5 and 2 parts by weight, are used per 100 parts by weight polyol.

Use is made, as a catalyst, of tertiary amine compounds, such as for example N,N'-dimethylcyclohexylamine, diaminobicyclo-octane (DABCO), etc., or metal salts or alkali or alkaline-earth metal salts of organic or inorganic origin, such as for example potassium octoate and dibutyltin dilaurate.

Essentially, the balance between the trimerization reactions and the polyurethane formation is kept in equilibrium by means of these catalysts. The amounts which are used are dependent on the catalytic activity and are typically situated between 0.01 and 10 parts by weight, and more specifically between 0.01 and 4 parts by weight, per 100 parts by weight polyol.

Extra additives, such as for example fire retardants (phosphorus and halogen containing additives or polyols), smoke suppressors, additional cross-linkers, fillers, diluents, etc. can always be added to give the final product certain specific properties. This invention allows for the manufacture of foams either according to a continuous process, or to a discontinuous process, to prepare in the shape of plates (whether or not coated) blocks, in situ molded pieces and as sprayed foam.

It appears that the properties of these foams are comparable with those of HCFC blown foams. The foams with 1-chloropropane as blowing agent show however a slight tendency to shrink which may by useful for certain applications.

The invention is, of course, in no way limited to the here above described embodiments and several modifications can be taken into account within the scope of the invention, e.g., concerning the relative amounts of the as blowing agent used relative to the chloropropane and also concerning the composition of the reaction mixture for the polyisocyanurate foam or the with polyurethane modified polyisocyanurate foam preparation.

The nomenclature for the HFCs and HFEs are as follows:

HFC 245 fa 1,1,1,3,3 pentafluoropropane

HFC 227ea 1,1,1,2,3,3,3 heptafluoropropane

HFC 236 fa or FE 36 1,1,1,3,3,3 hexafluoropropane

HFC 365 mfc 1,1,1,3,3 pentafluorobutane

HFE 7100 3M Novec™ mixture of methyl nonafluoroisobutyl ether and methyl nonafluorobutyl ether.

The use of blends of 2-chloropropane with perfluorocarbon compounds, hydrofluoroether compounds and hydrofluoropolyether compounds are also claimed as novel. A partial listing of the representative compounds is given below.

Perfluorocarbons octofluoropropane hexafluoroethane octafluorocyclobutane perfluoropropylene tetrafluoromethane Fluoroethers bis(2,2,2trifluoroethyl) ether n-butyl-1,1,2,2-tetrafluoroethyl ether difluoromethyl 2,2,2-trifluoroethyl ether ethyl 1,1,2,2-tetrafluoroethyl ether 1,1,1,3,3,3-hexafluoro-2-(fluoromethoxy) propane Hydrofluoropolyethers 1-difluoromethoxy-bis-(difluoromethyl ether 1-difluoromethoxy-1,1,2,2-tertrafluoroethyl difluoromethyl ether.

Experimental Results Leading to the Invention

EXAMPLE 1

The purpose of the testing was to determine the amount of FE-36 required in a blend with isopropyl chloride (IPC) to suppress the IPC flash point under the DOT approved method ASTM D 3828 "Standard Test Methods for Flash Point by SetaFlash Closed Tester". IPC has an extremely low flash point at −32° C. (closed cup). The results suggest that a blend with between 80% and 90% IPC and 10% to 20% FE-36 may be non-flammable as defined by the method.

Details

The following blends were tested with the SetaFlash Laboratory unit:

TABLE I

FE-36/IPC Blends Tested by SetaFlash Method ASTM D 3828

| Sample No. | IPC wt. % | FE-36 | Observations - all at ° F. |
|---|---|---|---|
| 492-121-1 | 48.44% | 51.56% | Flame applied at −15, −10, −5 and 0 -yellow flame above cup. At 5, 10 and 15 only "flashback" occurred. Overall no flash point observed. The test was repeated at −17, −15 and −10 where the |

TABLE I-continued

FE-36/IPC Blends Tested by SetaFlash Method ASTM D 3828

| Sample No. | IPC wt. % | FE-36 | Observations - all at ° F. |
|---|---|---|---|
| | | | flame extinguished when applied. At −5 and 0 again yellow flame appeared. At 5, 10 and 15 "flashbacks" and no flash for 20, 25, 30. At 35 burned above cup |
| 492-121-2 | 72.0 | 28.0% | Flame applied at −10, −5, 0, 10 and 15 No flash. At 25, yellow flame burns above the cup No flash point observed Test repeated at −23, −20, −15, −10, −5, 0, 5, 10, 15 20. No flash observed throughout the test |
| 492-123-1 | 91.6% | 8.4% | Flash point observed at −20 |
| 492-123-2 | 83.6% | 16.4% | Flame applied at −25. Appeared to be "flashback". At −20, −15, −10, −5 there was no flash. At 0, 10, 15 Yellow flame above cup. No flash point observed The test repeated at −25 and −20. Again "flashback" was seen |

In the method, the flame must be pulled down into the cup and sweep across the sample surface quickly after the flame is applied for a true flash point. However, the "flashback" observations for Sample #492-123-2 suggest that the 84% IPC level may be near the breakpoint for non-flammability. The "flashback" occurred when the flame was applied and hovered over the liquid surface for a couple of seconds and then lifted from the open cup. Although this behavior is not uncommon for chlorinated solvents and not considered a true flash point, the fact that it occurred at the lowest measurable temperature suggests the blend may be near the flammability limits for IPC concentration.

EXAMPLE 2

The purpose of the testing was to determine the amount of HFC 245 fa required in a blend with isopropyl chloride (IPC) to suppress the IPC flash point under the DOT approved method ASTM D 3828 "Standard Test Methods for Flash Point by SetaFlash Closed Tester". IPC has an extremely low flash point at −32° C. (closed cup). Results were surprising in that a blend with as much as 43.5% IPC showed no flash point as defined by the method.

Details

The following blends were tested with the SetaFlash laboratory unit:

TABLE I

HFC 245fa/IPC Blends Tested by SetaFlash Method ASTM D 3828

| Sample No. | IPC wt. % | HFC 245 fa | Observations - all at ° F. |
|---|---|---|---|
| 492-116-1 | 16.5 | 83.5 | Flame applied at −20, −15, −10, −5, 0, 10, 15, 20, 25, 30, 35, 40, 45, 50, 55- yellow flame above cup. No flash point observed |
| 492-116-2 | 21.5% | 78.5% | Flame applied at −20, −15, −10, −5, 0, 10, 15, 20, 25, 30, 35, 40, 45, No flash point observed |
| 492-116-3 | 100% | 0% | Flame applied at −20 - Flash point readily observed |
| 492-118-1 | 33.8% | 66.2% | Flame applied at −20, −15, −10, −5, 0, 10, 15, 20, 25 Yellow flame above cup. No flash point observed |
| 492-118-2 | 39.2% | 60.8% | Flame applied at −20, −15, −10, −5, 0 all had very large green flame, flame applied at 10, 15, 20, 25 Yellow flame above cup. No flash point observed |
| 492-118-3 | 43.5% | 56.5% | Flame applied at −20, −15, −10, −5, 0 all had very large green flame, flame applied at 10, 15, 20 Yellow flame above cup. No flash point observed |
| 492-119-1 | 50.2% | 49.8% | Flame applied at −20 - Flash point readily observed |

The observations above were consistent with the typical character of chlorinated solvents in flash point testing. Usually, as the flash point temperature is approached, the applied flame becomes green and enlarged. However, this is not a flash point as defined by the ASTM method. In the method, the flame must be pulled down into the cup and sweep across the sample surface for a true flash point.

HFC 245 fa/cyclopentane blends were also tested for comparison to the previously studied HFC 245 fa/IPC blends flash-point results. No flash points were determined for either blend that had between 40% and 45% flammable component concentrations. However, the observations during the HFC 245 fa/IPC blend tests were similar to that seen with other chlorinated solvents in flash point testing. The HFC 245 fa/cyclopentane blend exhibited yellow flame burning throughout the temperature range of the test.

EXAMPLE 3

The purpose of the testing was to determine the amount of HFC 227 ea required in a blend with isopropyl chloride (IPC) to suppress the IPC flash point under the DOT approved method ASTM D 3828 "Standard Test Methods for Flash Point by SetaFlash Closed Tester". IPC has an extremely low flash point at −32° C. (closed cup). Results show that between 90% and 93% IPC concentrations have no flash point as defined by the ASTM method.

Details

Results for flash point testing of HFC 227ea/IPC blends are shown in Table I. Flashback observations where shown are not true flash points as defined by the ASTM method.

TABLE I

HFC 227ea/IPC Blends Tested by SetaFlash Method ASTM D 3828

| Sample No. | IPC wt. % | HFC 227 ea | Observations-all at ° F. |
|---|---|---|---|
| 492-149-2 | 58.21 | 41.79 | Flame applied at −25, −20, −15, −10, −5, 0, 10, 15, 20, 25 Flame extinguished each case, at 30 yellow flame tip, at 35 yellow flame starting to burn above cup. No flash point observed |
| 492-151-1 | Between 78% and 86%* | Between 22% and 14%* | Flame applied at −20, −15, −10, −5 Flame extinguished each case at, 0 yellow flame tip and flashback starting, same for 10, 15, 20, at 25 and 30 burns above cup No flash point observed |
| 492-152-1 | 89.33% | 10.67 | Flame applied at −22, −20, −15, −10, −5 Flame extinguished each case, at 0 yellow flame tip no flashback, at 5 yellow flame but extinguished, at 10, 15, 20, 25, 30, 35 yellow flame gradually burning above cup. No flash point observed |
| 492-152-1 | 89.33 | 10.67 | Repeat fresh sample. −21 no flash green/blue flame, −20 flame extinguished, −15, −10, −5, 0, 5, 10, 15, 20 25 yellow tip flame gradually burning above cup as before |
| 492-153-1 | 92.67 | 7.33 | −21 no flash blue/green flame, −20 flame extinguished, −15 yellow tip flame some flashback, −10 to 25 yellow tip increasing no flashbacks |
| 492-153-1 | 92.67 | 7.33 | Repeat fresh sample, −22 flashpoint observed but flame applied quickly, uncertain that sample was at equilibrium temperature |
| 492-153-1 | 92.67 | 7.33 | Repeat fresh sample, −25 flame applied and extinguished, sample was at this temperature or below at least 2 minutes prior to flame application, −22 no flash slight yellow tip to flame, behavior at temperature increased to 25 was similar to the first 492-153-1 test |

TABLE I-continued

HFC 227ea/IPC Blends Tested by SetaFlash Method ASTM D 3828

*In the process, some loss of HFC 227ea was observed. Values shown are based on gravimetric calculations for the case that no HFC 227ea was lost or the case that the weight loss observed following known mls addition of IPC is all due to HFC 227ea loss.

The results suggest that an IPC concentration of between 89% and 93% blended with HFC 227ea may be considered non-flammable by the Standard DOT ASTM test.

EXAMPLE 4

This report summarizes the boiling point and azeotrope studies conducted on IPC/HFC blends. The purpose of the studies was to identify azeotropes or azeotropic-like compositions that could prove useful in foam blowing applications. HFC 245 fa and HFC 365 mfc were chosen for the studies because they are considered the most likely commercial high volume options in foam blowing applications.

Azeotropes

Azeotropic mixtures or azeotrope-like mixtures exhibit either a maximum or a minimum boiling point. These mixtures have the same composition both in the liquid and the vapor and they can not be separated into their components by distillation. Therefore, boiling point curves were generated for both IPC/HFC 245 fa and IPC/HFC 365 mfc mixtures. The first boiling point measured was of one pure component and then measurements were taken upon gradual additions of the second component. The azeotropic mixture experiments were carried out at one atmospheric pressure.

1. Boiling point study results show no maximum or minimum boiling point for mixtures of IPC and HFC 245 fa.
2. A minimum boiling point of 33° C.±1° C. at one atmosphere pressure was observed for a 39.95% HFC 365 mfc/60.05% IPC composition. A 32-plate Oldershaw distillation of a mixture of HFC 365 mfc and IPC showed an azeotropic composition of 54% IPC and 46% HFC 356 mfc at 33° C.±1° C. at one atmosphere pressure.
3. No azeotropes were observed for mixtures of HFC 365 mfc, IPC and HFC 245 fa. In fact, the overhead temperatures at all times exceeded the boiling point of pure HFC 245 fa which is 15° C. The overhead temperatures also remained lower than the boiling points for HFC 365 mfc and IPC which are 40° C. and 36° C., respectively.

Details

Equipment

1. Mini-ware glassware—three necked 250 ml round bottom flask, 60 ml addition funnel with pressure equalization tube, condenser, thermowell
2. Digi-Sense Cole Palmer digital thermometer, J thermocouple
3. RM6 Lauda Brinkman circulator bath with ethylene glycol, Super RMT Lauda chiller
4. Research & Development pilot plant isopropyl chloride
5. HFC 245 fa, 1,1,1,3,3 pentafluoropropane, CAS 460-73-1, pressurized with nitrogen CAS 7727-37-9, Allied-Signal, Lot 1870

6. Teflon boiling chips
7. Variac heater
8. Solvay HFC 365 mfc Sample No. 492-157-1, Solkane® 1,1,1,3,3-pentafluorobutane
9. Oldershaw 32-plate distillation column
10. Chiller Neslab FTC350 coupled with Neslab EX211 bath with ethylene glycol/water.
    11. Stainless steel cylinder 150 ml capacity Procedures A gas chromatograph was used to determine HFC/IPC compositions. Sufficient cooling with ice, dry ice and chillers was required to adequately quantify the HFC 245 fa.

Boiling Point Tests

The apparatus was modified to allow better cooling of the condenser. A RM6 Lauda Brinkman circulator bath of ethylene glycol was used with a Super RMT Lauda chiller. The temperature was set to −15° C. during the experiments. In addition, bubbler glassware was connected to the top of the condenser to verify sufficient cooling of the vapors. A Variac heater was used to add heat where necessary to boil the blends.

Boiling point measurements were taken using an ebulliometric technique.[1] The flask was initially charged with HFC 245 fa and the boiling point was measured with the digital thermometer. Gradual additions of IPC were made and each was allowed to equilibrate at least 10 minutes before the boiling point temperature was recorded. The ambient barometric pressure was recorded during testing and the temperature readings were corrected as follows:

Corrected boiling point=F+0.06(760−P) where
F=observed boiling point
P=observed ambient barometric pressure, mm Hg [1]
*Annual Book of ASTM Standards*, Vol. 15.05, ASTM D1120-93, "Standard Test Method for Boiling Point of Engine Coolants", p.7–9

Oldershaw Distillations

A 32-plate Oldershaw distillation column was used to verify azeotropic mixtures. When HFC 245 fa was used in the composition, the Neslab chiller system was required to condense the overhead for sampling.

Results and Discussion

BRIEF DESCRIPTION OF DRAWING

HFC 245 fa

FIG. 1 shows the boiling point results for blends of IPC and HFC 245 fa. As IPC was added, the boiling point was observed to increase. Results suggest that there are no azeotropic mixtures for these two components.

HFC 365 mfc

FIG. 2 shows the boiling point curve for IPC and HFC 365 mfc mixtures. FIG. 3 shows a repeated boiling point test.

The minimum boiling point observed for the second test was 33.1° C.(corrected for barometric pressure) at a 39.95% HFC 365 mfc and 60.05% IPC composition.

FIG. 4 shows Oldershaw distillation results for a starting 50/50 mixture of IPC/HFC 365 mfc. As the IPC concentration in the bottoms was increased gradually through an addition funnel the overhead IPC composition stabilized at 54% IPC and 46% HFC 365 mfc. This is the azeotropic composition observed at 33° C.±1° C. at one atmosphere pressure.

FIG. 5 shows results for an Oldershaw distillation of a starting mixture of approximately 20% HFC 245 fa, 20% IPC and 60% HFC 365 mfc. No pure component additions were made during the run due to the low boiling point of HFC 245 fa which is 15° C. Instead the amount of bottoms material was gradually removed to observe bottoms and overhead composition changes. Results suggest that there are no azeotropes for these mixtures. As expected for a zeotrope, the lighter components initially dominate the overhead composition. As the lighter components are lost, the overhead composition increases in heavier components. No data point is shown in the graph for Sample Set 1 since the sample drawn was not cooled sufficiently to provide liquid for GC analysis.

FIG. 6 shows the boiling point results for blends of IPC and HFE 7100 (see Ex. 5)

FIG. 7 shows older show distilation results for a stating 48/52 mixture of IPD/HFE 7100.

Table I shows the bottoms and overhead temperatures for each sample set.

TABLE I

Sampling Temperatures at One Atmosphere Pressure

| Sample Set | Bottoms, ° C. | Overhead, ° C. |
|---|---|---|
| 1 | 30.0 | 18.3 |
| 2 | 30.6 | 18.3 |
| 3 | 31.2 | 18.6 |
| 4 | 31.6 | 18.4 |
| 5 | 32.6 | 19.7 |

These values are consistent with the analytical data since the temperature increases in the overhead as the lighter component is removed and the heavier component concentrations increase. Similarly, the temperature increases in the bottoms since the lighter component is removed from the bottoms. The overhead temperatures at all times exceeded the boiling point of pure HFC 245 fa which is 15° C. The overhead temperatures also remained lower than the boiling points for HFC 365 mfc and IPC which are 40° C. and 36° C., respectively.

EXAMPLE 5

This report summarizes the boiling point, azeotrope and flash point studies conducted on IPC and hydrofluoroether (HFE) blends. The purpose of the studies was to identify azeotropes or azeotropic-like compositions that could prove useful in foam blowing applications. HFE 7100 was chosen for study due to the commercial availability from 3M.

Summary

Azeotropic mixtures exhibit either a maximum or a minimum boiling point. These mixtures have the same composition both in the liquid and the vapor and they can not be separated into their components by distillation. Therefore, a boiling point curve was generated for IPC/HFE 7100 mixtures. The first boiling point measured was of one pure component and then measurements were taken upon gradual additions of the second component.
1. The boiling point study results showed a minimum boiling point of 28° C.±1° C. at one atmosphere pressure over an approximate range of IPC concentrations of 45 to 60 percent.

2. A 32-plate Oldershaw distillation of a mixture of HFE 7100 and IPC showed an azeotropic composition of 78% IPC and 22% HFE 7100 at 35° C.±1° C. at one atmosphere pressure.
3. Setaflash flash point testing results for the azeotrope of 78% IPC/22% HFE 7100 showed a flash point as low as −24° C. This temperature was the lowest temperature at which the flame was applied in the test. A similar flash point test for an 80% HFE 7100 and 20% IPC blend, showed a flash point at −24° C.

Details

Equipment

1. Mini-ware glassware—three necked 250 ml round bottom flask, 60 ml addition funnel with pressure equalization tube, condenser, thermowell
2. Digi-Sense Cole Palmer digital thermometer, J thermocouple
3. RM6 Lauda Brinkman circulator bath with ethylene glycol, Super RMT Lauda chiller
4. Research & Development pilot plant isopropyl chloride
5. HFE 7100, methyl nonafluoroisobutyl ether and methyl nonafluorobutyl ether mixture, 3M Novec HFE 7100
6. Teflon boiling chips
7. Variac heater
8. Oldershaw 32-plate distillation column
9. Chiller Neslab FTC350 coupled with Neslab EX211 bath with ethylene glycol/water.

Procedures

A gas chromatograph was used to determine HFE/IPC compositions.

Boiling Point Tests

Boiling point measurements were taken using an ebulliometric technique that has been used in previous studies for IPC blends. The flask was initially charged with IPC and the boiling point was measured with the digital thermometer. Gradual additions of HFE 7100 were made and each was allowed to equilibrate at least 10 minutes before the boiling point temperature was recorded. The ambient barometric pressure was recorded during testing and the temperature readings were corrected as follows:

Corrected boiling point=F+0.06(760−P) where
   F=observed boiling point
   P=observed ambient barometric pressure, mm Hg Oldershaw Distillations A 32-plate Oldershaw distillation column was used to verify azeotropic mixtures.

Results and Discussion

FIG. 6 shows the boiling point results for blends of IPC and HFE 7100. As HFE 7100 was added, the temperature of the overhead was observed to reach a minimum level of 28° C.±1° C. The wt. % IPC values shown in the graph are based on calculations for known volumetric HFE 7100 additions to the bottoms rather than GC analyses of bottoms or vapor samples.

FIG. 7 shows Oldershaw distillation results for a starting 48/52 mixture of IPC/HFE 7100. As the HFE 7100 concentration in the bottoms was increased gradually through an addition funnel, the overhead IPC composition stabilized at 78% IPC and 22% HFE 7100. This is the azeotropic composition observed at 35° C.±1° C. at one atmosphere pressure. The wt. % IPC concentrations shown in this graph are results from samples analyzed by GC for both the bottoms and the overhead.

SetaFlash Flash Point Tests

The azeotropic mixture was tested by flash point using the SetaFlash instrument. A flash point of −24 ° C. was observed. This temperature was the lowest temperature at which the flame was applied above the sample cup. A similar flash point test for an 80% HFE 7100 and 20% IPC blend also showed a flash point at −24° C.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A composition useful as a blowing agent having no flash point or reduced combustibility comprising 2-chloropropane and a gas selected from the group consisting of perfluorocarbons, hydrofluoropolyethers and mixtures thereof.

2. The composition of claim 1 useful as a blowing agent having no flash point or reduced combustibility comprising 2-chloropropane and wherein the perfluorocarbons are selected from the group of octofluoropropane, hexafluoroethane, perfluoropropylene, tetrafluoromethane and mixtures thereof.

3. A composition useful as a blowing agent having no flash point or reduced combustibility comprising 2-chloropropane and a fluoroether selected from the group consisting of bis(2,2,2trifluoroethyl)ether, n-butyl 1,1,2,2-tetrafluoroethyl ether, difluoromethyl 2,2,2-trifluoroethyl ether, ethyl 1,1,2,2 tetrafluoroethyl ether, 1,1,1,3,3,3 hexafluoro-2-(fluoromethoxy) propane and mixtures thereof.

4. A composition useful as a blowing agent having no flash point or reduced combustibility comprising 2-chloropropane and a mixture of methyl nonafluoroisobutyl ether and methyl nonafluorobutyl ether.

5. The composition of claim 1 useful as a blowing agent having no flash point or reduced combustibility comprising 2-chloropropane and wherein the hydrofluoropolyethers are selected from the group consisting of 1-difluoromethoxy-bis-(difluoromethyl ether, 1-di fluoromethoxy-1,1,2,2-tertrafluoroethyl difluoromethyl ether and mixtures thereof.

6. A composition useful as a blowing agent having no flash point or reduced combustibility comprising 2-chloropropane and a fluorohydrocarbon selected from the group consisting of 1,1,1,3,3 pentafluoropropane, 1,1,1,2,3,3,3 heptafluoropropane, 1,1,1,3,3,3 hexafluoropropane and mixtures thereof.

7. The composition of claim 6 useful as a blowing agent having no flash point or reduced combustibility comprising about 80–90% of 2-chloropropane and about 10–20% of 1,1,1,3,3,3 hexafluoropropane.

8. The composition of claim 6 useful as a blowing agent having no flash point or reduced combustibility comprising greater than 0.5% to less than 50.2% of 2-chloropropane and the balance being 1,1,1,3,3 pentafluoropropane.

9. The composition of claim 8 useful as a blowing agent having no flash point or reduced combustibility comprising about 16.5 to 43.5% of 2-chloropropane and about 83.5 to 56.5%of 1,1,1,3,3 pentafluoropropane.

10. The composition of claim 6 useful as a blowing agent have no flash point or reduced combustibility comprising greater than 0.5% to less than 93% 2-chloropropane and the balance being 1,1,1,2,3,3,3 heptafluoropropane.

11. The composition of claim 10 useful as a blowing agent having no flash point or reduced combustibility comprising about 58 to 93% 2-chloropropane and about 42 to 7% 1,1,1,2,3,3,3 heptafluoropropane.

12. An azeotrope-like mixture at one atmosphere comprising about 50–60% 2-chloropropane and about 40–50% 1,1,1,3,3 pentafluorobutane.

13. The azeotrope-like mixture at one atmosphere of pressure of claim 12 comprising about 54% 2-chloropropane and about 46% 1,1,1,3,3 pentafluorobutane.

14. An azeotrope-like mixture at one atmosphere of presure comprising about 78% 2-chloropropane and about 22% of a mixture of methyl nonafluoroisobutyl ether and methyl nonafluorobutyl ether.

15. The composition of claim 1 further comprising polyisocyanurate foam or polyurethane modified polyisocyanurate foam.

16. The composition of claim 2 further comprising polyisocyanurate foam or a polyurethane modified polysisocyanurate foam.

17. The composition of claim 3 further comprising polyisocyanurate foam or polyurethane modified polyisocyanurate foam.

18. The composition of claim 4, further comprising polyisocyanurate foam or polyurethane modified polyisocyanurate foam.

19. The composition of claim 5, further comprising polyisocyanurate foam or polyurethane modified polyisocyanurate foam.

20. The composition of claim 6, further comprising polyisocyanurate foam or polyurethane modified polyisocyanurate foam.

21. The composition of claim 7, further comprising polyisocyanurate foam or polyurethane modified polyisocyanurate foam.

22. The composition of claim 8, further comprising polyisocyanurate foam or polyurethane modified polyisocyanurate foam.

23. The composition of claim 9, further comprising polyisocyanurate foam or polyurethane modified polyisocyanurate foam.

24. The composition of claim 10, further comprising polyisocyanurate foam or polyurethane modified polyisocyanurate foam.

25. A method for preparing mainly closed, cell shaped polyisocyanurate foam or polyurethane modified polyisocyanurate foam, wherein foam formation is performed with the use of a physical blowing agent comprising 2-chloropropane along wit a mixture of methyl nonafluoroisobutyl ether and methyl nonafluorobutyl ether which lowers the combustibility of the 2-chloropropane.

26. The composition of claim 11 further comprising polyisocyanurate foam or polyurethane modified polyisocyanurate foam.

27. The composition of claim 12 further comprising polyisocyanurate foam or polyurethane modified polyisocyanurate foam.

28. The composition of claim 13 further comprising polyisocyanurate foam or polyurethane modified polyisocyanurate foam.

* * * * *

UNITED STATES PATENT AND TRADEMARK OFFICE
CERTIFICATE OF CORRECTION

PATENT NO.     : 6,646,020 B1
DATED          : November 11, 2003
INVENTOR(S)    : Nyberg et al.

It is certified that error appears in the above-identified patent and that said Letters Patent is hereby corrected as shown below:

Column 7,
Line 42, delete the period "." after "°C such that" "°C." reads -- °C --.

Column 8,
Line 65, delete the period "." after "°C such that" "°C." reads -- °C --.

Column 10,
Lines 41 (2 instances), 46 (2 instances) and 52 (2 instances), delete the period "." after "°C such that" "°C." reads -- °C --.

Column 11,
Lines 20 and 62, delete the period "." after "°C such that" "°C." reads -- °C --.

Column 12,
Lines 29 (2 instances), 44 (2 instances) and 65 (2 instances), delete the period "." after "°C such that" "°C." reads -- °C --.

Column 13,
Lines 3 (2 instances) and 59 (1st instance), delete the period "." after "°C such that" "°C." reads -- °C --.

Column 14,
Lines 1 (1st instance) and 7, delete the period "." after "°C such that" "°C." reads -- °C --.
Line 46, "1-di fluoromethoxy-1,1,2,2" should read -- 1-difluoromethoxy-1,1,2,2 --.

Signed and Sealed this

Eighteenth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,646,020 B1
DATED : November 11, 2003
INVENTOR(S) : Nyberg et al.

It is certified that error appears in the above-identified patent and that said Letters Patent is hereby corrected as shown below:

Column 7,
Line 42, delete the period "." after °C such that ""°C." reads -- °C --.

Column 8,
Line 65, delete the period "." after °C such that ""°C." reads -- °C --.

Column 10,
Line 41, (2 instances); delete the period "." after °C such that ""°C." reads -- °C --.
Line 46, (2 instances); delete the period "." after °C such that ""°C." reads -- °C --.
Line 52, (2 instances); delete the period "." after °C such that ""°C." reads -- °C --.

Column 11,
Line 20, delete the period "." after °C such that ""°C." reads -- °C --.
Line 62, delete the period "." after °C such that ""°C." reads -- °C --.

Column 12,
Line 29, (2 instances); delete the period "." after °C such that ""°C." reads -- °C --.
Line 44, (2 instances); delete the period "." after °C such that ""°C." reads -- °C --.
Line 65, (2 instances); delete the period "." after °C such that ""°C." reads -- °C --.

Column 13,
Line 3, (2 instances);delete the period "." after °C such that ""°C." reads -- °C --.
Line 59, (1st instances); delete the period "." after °C such that ""°C." reads -- °C --.

Column 14,
Line 1, (1st instances);delete the period "." after °C such that ""°C." reads -- °C --.
Line 7, delete the period "." after °C such that ""°C." reads -- °C --.

UNITED STATES PATENT AND TRADEMARK OFFICE
CERTIFICATE OF CORRECTION

PATENT NO. : 6,646,020 B1
DATED : November 11, 2003
INVENTOR(S) : Nyberg et al.

It is certified that error appears in the above-identified patent and that said Letters Patent is hereby corrected as shown below:

Column 14,
Line 46, "1-di fluoromethoxy-1,1,2,2" should read -- 1-difluromethoxy-1,1,2,2 --.

Signed and Sealed this

Fifteenth Day of June, 2004

JON W. DUDAS
*Acting Director of the United States Patent and Trademark Office*